United States Patent [19]

Bartholomew

[11] Patent Number: 5,295,718

[45] Date of Patent: Mar. 22, 1994

[54] END TERMINATING MEANS FOR PLASTIC AND RUBBER CONDUIT

[75] Inventor: Donald D. Bartholomew, Mt. Clemens, Mich.

[73] Assignee: Proprietary Technology, Inc., Southfield, Mich.

[21] Appl. No.: 973,538

[22] Filed: Nov. 9, 1992

Related U.S. Application Data

[63] Continuation of Ser. No. 697,222, May 6, 1991, abandoned.

[51] Int. Cl.$^5$ ............................................. F16L 33/20
[52] U.S. Cl. .................................. 285/258; 285/256; 29/507; 29/523
[58] Field of Search ................. 285/256, 258; 29/507, 29/508, 506, 523

[56] References Cited

U.S. PATENT DOCUMENTS

| | | | |
|---|---|---|---|
| 170,457 | 11/1875 | White | 285/258 |
| 2,338,666 | 1/1944 | Nelson | 285/258 |
| 2,479,702 | 8/1949 | Rood | 285/258 |
| 2,631,047 | 3/1953 | Spender et al. | 285/258 |
| 2,634,786 | 4/1955 | Stinchlomb et al. | 285/258 |
| 2,825,588 | 3/1958 | Howard | 285/258 |
| 2,902,299 | 9/1959 | Turner | 285/258 |
| 2,916,816 | 12/1958 | Black et al. | 285/258 |
| 2,924,009 | 2/1960 | Mazeika | 285/258 |
| 3,490,793 | 1/1970 | Wagner | 285/258 |
| 4,335,753 | 6/1982 | Frye | 285/258 |

FOREIGN PATENT DOCUMENTS

| | | | |
|---|---|---|---|
| 138557 | 10/1948 | Australia | 285/256 |
| 366622 | 5/1939 | Italy | 285/258 |

Primary Examiner—Eric K. Nicholson
Attorney, Agent, or Firm—Harness, Dickey & Pierce

[57] ABSTRACT

Connectable connector fittings for positioning on the terminal ends of flexible conduits include a first member positioned on the exterior surface of the terminal end of a conduit, a second member is positioned on the interior surface of the terminal end of the conduit, and a connector member coupled with either the first or second member. The first and second members are securely affixed by expanding the diameter of the second member outwardly against the first member to achieve a pressure fit whereby to provide a connectable connector fitting on the terminal end of the conduit.

6 Claims, 2 Drawing Sheets

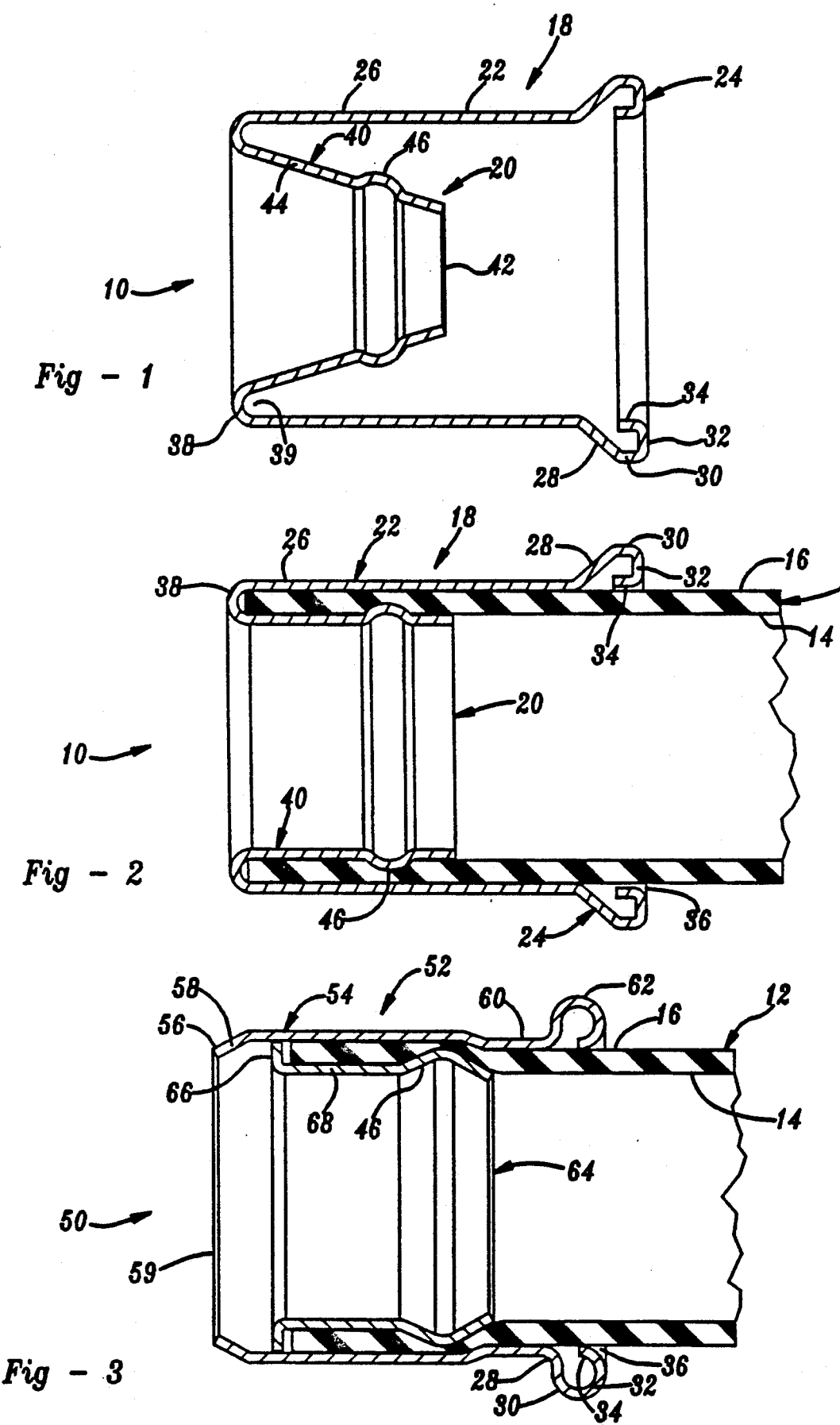

END TERMINATING MEANS FOR PLASTIC AND RUBBER CONDUIT

This is a continuation of U.S. patent application Ser. No. 697,222, filed May 6, 1991 now abandoned.

BACKGROUND AND SUMMARY OF THE INVENTION

The present invention relates to an end terminating arrangement for plastic and rubber conduit and more particularly to the securement of connectable male or female connector fittings onto the terminal ends o flexible resilient conduit.

As connector fittings become more and more popular in industry, the applications for connector fittings become ever increasing. Connector fittings play an important role in connecting conduits together in compressed air and low pressure hydraulic piping systems and in fluid apparatus. Further, connector fittings may be adapted for other tasks such as where a removable and insertable connection is needed between conduits or the like.

Generally, connectable male and female connector fittings are assembled on flexible conduits by the manufacturer. However, a standard size conduit having factory fittings will not always work in the field. Thus, there is a need in the art to position male or female connector fittings onto flexible conduit out in the field. Prior devices for positioning connectable connector fittings onto the terminal end of flexible conduit out in the field required the use of clamps. Although clamps are adequate for positioning male and female fittings on the terminal ends of conduits, the clamps are easily stripped when tightened by a screwdriver or the like. Heating is used to position male and female fittings onto the terminal ends of conduit. The heating, if not executed properly, has a tendency to melt or deform the plastic and/or rubber conduit, ruining the conduit. Also, self securing connector fittings which cut into the surface of the conduit are used to secure the connector fitting onto the terminal ends of the conduit. However, the self-securing fitting has a tendency to penetrate the conduit surface causing a weak spot in the conduit. Further, adhesives are used to secure connector fittings onto the terminal ends of conduits. However, adhesives are sloppy, require several solvents, and need time to set-up before use. Other disadvantages of the prior connector fitting securements will be apparent to those skilled in the art.

Accordingly, it is an objective of the present invention to overcome the disadvantages of securing prior connector fittings to the terminal ends of flexible conduits out in the field. The present invention provides the user with a connectable fitting which is easily secured with a minimum amount of skill. The present invention provides the art with a new and improved apparatus for positioning a connectable male or female connector fitting onto terminal ends of flexible resilient conduits. The connector apparatus in accordance with the present invention can easily be secured onto the terminal end of a flexible conduit by a pressure fit eliminating the uncertainties involved with clamping, heating, adhesives, and penetration fittings.

The present invention includes a first member positioned about the exterior surface of the terminal end of the flexible conduit. A second member is positioned about the interior surface of the terminal end of the conduit. A mechanism acting as a male or female connector fitting is coupled with either the first o second member. The two members are securely affixed, by a pressure fit, to the terminal end of the conduit forming a connectable connector fitting o the terminal end of the conduit.

The first member may have a projecting member for providing the fitting with a surface for securing the connector fitting into a female connector fitting. Also, a female connector fitting may be continuous with either the first member or second member for providing the terminal end of the conduit with a female fitting. The first and second members may be continuous with one another forming a connector fitting on the terminal end of a conduit. The first and second members may be separate and distinct members forming a two piece connector fitting.

Generally, the first member includes a cylindrical body portion positioned about the exterior surface of the conduit. The body portion has at least one discontinuity in its surface for improving the affixing of the conduit between the first and second member.

Generally, the second member includes a cylindrical body portion positioned on the interior surface of the terminal end of the conduit. The cylindrical body portion has a peripheral bead on its exterior surface for improving the affixment of the conduit between the first and second members.

The method disclosed herein permits the use of the deep drawing progressive stamping manufacturing process which allows generally cylindrical parts to be formed from thin metal strip stock. The exceedingly close and repeatable tolerances and smooth surface finishes that are common to this process allow the manufacturer of conduit attachment components to precisely control dimensions whereby the user can obtain an attachment in the field that is as accurate as the best factory made attachment.

Although attachments to conduit having a thin wall and formed of plastic are known, material imperfections can undesirably lead to failures such that only relatively noncritical applications have been considered for terminating conduit that is larger than about 8 mm. in inside diameter. The cost of the plastic material generally results in the conduit wall thickness being held to a minimum which has the effect of severely limiting the performance of larger diameter conduit attachments, even though the conduit itself is capable of better performance. Nylon and other harder plastics permit the use of non-reinforced tubing but have not reduced user costs because of the reliability of the termination arrangement. The best currently available terminations usually involve wrenching and torquing arrangements which are operator sensitive. Where these attachment arrangements are also combined with a fitting that must be pre-installed on a device being connected by the conduit, space limitations prevent reliable wrenching to secure to the conduit. These prior art attachment arrangements are relatively expensive when compared to the attachment arrangements disclosed herein. The attachment arrangement, in accordance with this invention, makes possible the reliable use of lower cost high-performance conduit and use of quick connectors of the nature of those described in U.S. Pat, Nos. 4,423,892 and 4,541,658, assigned to the same assignee as the present invention, the disclosures of which are herein incorporated by reference.

From the subsequent description and the appended claims taken in conjunction with the accompanying drawings, other objects and advantages of the present invention will become apparent to one skilled in the art.

BRIEF DESCRIPTION OF THE DRAWINGS

FIG. 1 is a cross sectional view of a male connector apparatus in accordance with the present invention;

FIG. 2 is a cross sectional view of the connector apparatus of FIG. 1 shown affixed to a conduit;

FIG. 3 is a cross sectional view of an alternate embodiment of a male connector apparatus in accordance with the present invention;

DETAILED DESCRIPTION OF THE PREFERRED EMBODIMENT

Figure 4:
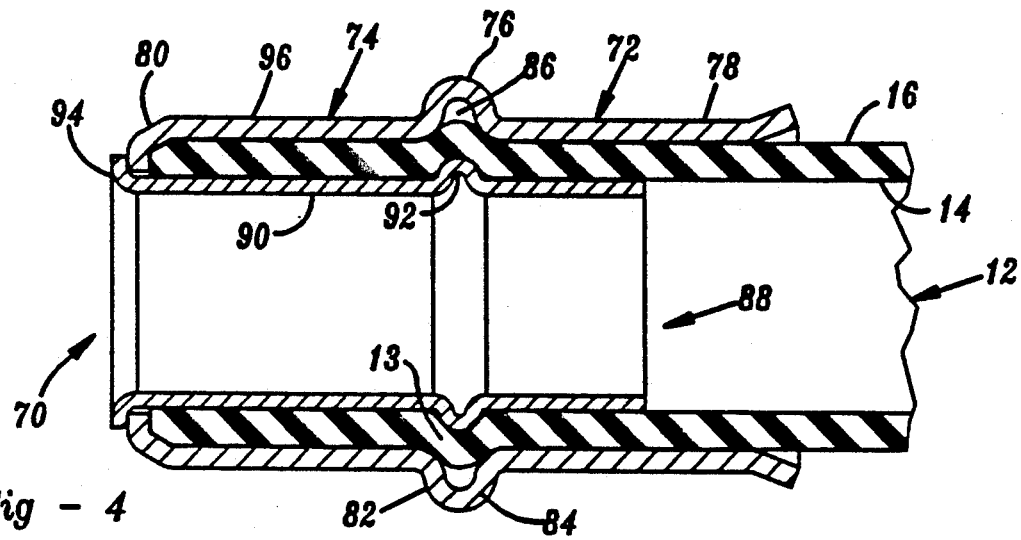
FIG. 4 is a cross sectional view of an alternate embodiment of a male connector apparatus in accordance with the present invention.

Referring to FIGS. 1 through 3, a male connector fitting is shown and is designated with the reference numeral 10. The male connector fitting 10 is affixed to a terminal end of a flexible resilient tubular conduit 12. The conduit is generally formed from a polymeric material such as plastic or rubber and has cylindrical inner and outer surfaces 14 and 16. The male connector fitting 10 has a first member 18 positioned about the exterior surface 16 of the terminal end of the conduit 12 and a second member 20 which is positioned on the interior surface 14 of the terminal end of the conduit 12. The first member 18 and second member 20 are forcibly pressure fit together whereby to securely affix the wall of conduit 12 between the two members as seen in FIG. 2.

The first member 18 includes a cylindrical body portion 22 and a projecting flange member 24. The projecting flange member 24 is continuous with and adjacent to the cylindrical body portion 22, body portion 22 including a continuous cylindrical wall 26 which surrounds the exterior surface 16 of the terminal end of the conduit 12 and an annular peripheral wall 28 that is continuous with and projects from the cylindrical wall 26. A wall 30 continuous with wall 28 and substantially parallel to the cylindrical wall 26 extends from the wall 28. A depending wall 32 is continuous with wall 30 and is substantially parallel with wall 28. A peripheral lip 34 extends from wall 32, the lip being substantially on the same line as cylindrical body wall 26 and defining an opening 36 which enables the fitting 10 to be positioned about the exterior surface of the conduit 12.

The second member 20 is continuous with the first member 18 by a bend wall 38. The bend wall 38 defines a U-shaped channel 39 which receives and is abutted against the terminal end of the conduit 12 for proper orientation of the conduit 12 in the fitting 10. The second member 20 forms a body portion 40 that extends inside of the first member 18 a desired distance and defines an opening 42. Body portion 40 is formed by a continuous cylindrical wall 44 having a projecting discontinuity that forms a peripheral bead 46 in the exterior surface of the cylindrical body wall 44. The cylindrical body wall 44 annularly departs from the bend 38 a it projects into the interior of the first member 18. Generally the fitting is manufactured from a resilient metallic material permitting deformation of the second member 20 for securing the conduit 12 in the fitting 10 as will be discussed herein.

FIG. 3 illustrates a second embodiment of the present invention showing a male connector fitting 50 having a two piece construction comprising first and second members 52 and 64. First member 52 is positioned around the terminal end of the conduit 12 and includes a cylindrical body portion 54. The body portion 54 has a free depending end 56 terminating in an angular end portion 58 to define an opening 59 at the terminal end of the conduit 12 and a peripheral discontinuity 60 in its surface adjacent the flange member 62. The discontinuity 60 is in the form of a peripheral groove and improves the affixment of the conduit 12 between the first member 52 and second member 64.

The second member 64 has a projecting flange 66 extending from a free end of the cylindrical body portion 68 which abuts the conduit 12 for properly orientating the conduit for affixment of the conduit 12 between the first and second members 52 and 64. Also, flange 66 abuts the interior surface of the cylindrical wall portion 54 of the first member 52 for further orientating the terminal end of the conduit 12.

Generally, as shown in FIG. 3, the first member 52 is positioned over the terminal end of the conduit 12. Angular end portion 58 has not been formed and opening 59 is large enough to slide over flange 66 of the second member 64. First member 52 is positioned such that the end of conduit 12 is projecting from first member 52, and second member 64 is installed into the end of conduit 12. First member 52 is then pulled over the flange 66 of second member 64 until peripheral discontinuity 60 is prevented from passing over conduit 12 end with second member 64 installed. A tool that forms first member 52 end 58 locks second member 64 into first member 52 and compresses conduit 12 against the reduced diameter peripheral discontinuity 60 secures and seals the assembly 50. The forming acts to drive second member 64 into first member 52, and lock second member 64 in place. The forming also provides an end lead for the assembly 50 that reduces the possibility of seal damage when end 50 is used with some connecting means. The tool used to form angle end 58 engages flange area 62 of first member 52 as a means of resisting the forces that are applied to form angle end 58.

The alternate method of manufacturing second member 64 so that end of the member is reduced in diameter as shown in FIG. 1 by 40, 42, 44, 46, and 20, and expanding second member 64 to lock and seal is not always desirable because the compressive strength of conduit 12 is often insufficient to withstand the initial pushing forces applied to second member 52. Where the internal diameters are large enough to permit insertion of a tool which itself expands, and in turn expands second member 64, then this alternative method is very useful.

The embodiment of FIG. 4 shows a means by which this alternative method becomes the primary method.

FIG. 4 illustrates another embodiment of the present invention and shows a male connector fitting 70 affixed to the terminal end of the conduit 12. A cylindrical first member 72 is positioned around the terminal end of conduit 12 and has a sleeve portion 74 and an outward radial annular bead 76 between its respective rearward and forward ends 78 and 80, the bead being formed with portions 82 and 84 and the interior of the bead forming a pocket 86 to receive an expanded and compressed portion 13 of conduit 12 when a cylindrical second member 88 is expanded radially outward. Second member 88 is cylindrical and includes a sleeve portion 90 and an outward annular bead 92, each engaging interior wall 14 of conduit 12. Outward annular bead 92 is encircled by bead 76 and portion 13 of conduit 12. Outward radial flange 94 at the forward end of sleeve portion 90 abuts the inward radial flange end 80 of first member 72 to provide a positioning function and resist the force that would drive sleeve portion 90 inward during the expansion of sleeve portion 90. The diameter expansion of conduit 12 is limited by forward portion 96 of cylindrical body portion 74 which engages the outer surface 16 of conduit 12. Second member 88, when coaxially inserted into conduit 12, will not allow conduit 12 to be axially forced out of the end of the first member 72, but acts to locate tube 12 at the proper positional relationship within first member 72 as second member 88 is expanded, as explained later.

Figure 5:
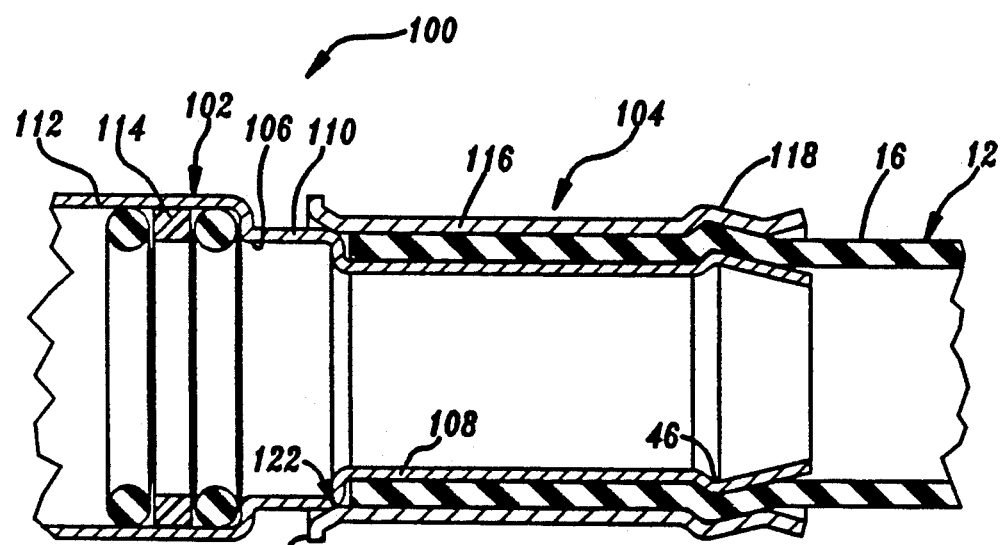
FIG. 5 is a cross sectional view of a female connector apparatus in accordance with the present invention.

FIG. 5 is another embodiment of the present invention illustrating a female connector fitting 100 having a two piece construction, comprising first and second members 102 and 104, affixed to the terminal end of the conduit 12. The first member 102 comprises a stepped cylindrical housing having a central bore 106 therethrough and including a cylindrical body portion 108 which is inserted into conduit 12, a first enlarged diameter portion 110 adjacent portion 108, and a second enlarged diameter portion 112 adjacent to the first enlarged diameter portion that enables a sealing member 114 to be positioned therein. The cylindrical body portion 108 annularly depends from the diameter portion 110. A peripheral bead 46 projects from the exterior surface of the cylindrical body portion 108. The cylindrical body portion 108 is forcibly expanded affixing the conduit 12 between the first and second members 102 and 104.

The second member 104 includes a cylindrical body portion 116 having a discontinuity 118 for improving the securement of the conduit 12 between the first and second members 102 and 104. The second member 104 fits about the outer surface 16 of conduit 12 and also has a projecting flange 120 on a free depending end of the cylindrical body portion 116 adjacent to the exterior surface of the diameter portion 110 of the housing. The flange 120 abuts the exterior wall 122, formed between body portion 108 and diameter portion 110, for properly orientating the conduit 12 upon the second member 104.

As in previous embodiments, body portion 108 would be expanded so that peripheral bead 46 is increased in diameter, locking and sealing tube 12 to body portion 108 as the expansion of tube 12 is limited by second member 104.

Figure 6:
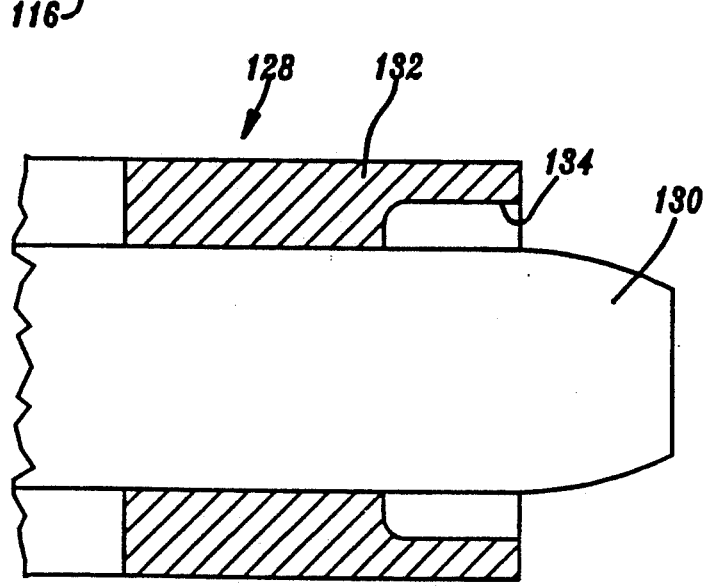
FIG. 6 is a partial cross sectional view of a tool used in affixing the connector apparatus to the conduit.

FIG. 6 illustrates a partial cross sectional view of tool 128 for affixing the first and second members of the respective fittings 10, 50, 70 and 100 about the conduit 12. The discussion will be given with reference to fitting 10 of FIG. 1 although it also applies to the other fittings. The basic idea of the tool is to expand the diameter of an inner portion or connector member in order to bring the outer diameter of a tube or hose into sealed attachment to an outer portion or connector member disposed over the hose or tube, or as described in FIG. 5, seal the inner diameter of a hose or tube to the connector member by limiting the expansion of the hose or tube. In the FIG. 1 embodiment tool 128 is configured for expanding the diameter of cylindrical body portion 40 of the second member 20 relative to first member 18. The diameter expansion of the cylindrical body portion 40 forms a pressure fit with the respective cylindrical body portion 22 of the first member 18, securely affixing the conduit 12 between the two members.

The tool 128 includes a plunger 130 slidably positioned within a body member 132. The plunger 130 includes a handle or other means (not shown) at one of its free ends for enabling the plunger 130 to be forcibly driven into the second member 20, and means (also not shown) which act to resist this in driving force in a manner that promotes the expansion. The body member 132 has an opening 134 for enabling the bend wall 38 to abut the body member 132. The plunger handle is drawn back sliding the plunger 130 out of the tool opening 134. The fitting 10 is positioned in the tool opening 134 with the bend wall 38 adjacent the body member 132. The plunger handle is driven forward, driving the plunger 130 into contact with the interior surface of the cylindrical body portion 40 of the second member 20. The plunger 130, due to its diameter size, forcibly expands the cylindrical body portion 40 of the second member 20 outward trapping the conduit 12 between the cylindrical body portions 22 and 40 of the first and second member 18 and 20, respectively. In doing so, the peripheral bead 46 traps the conduit 12 against the first member 18. Thus the conduit 12 is securely affixed between the two members 18 and 20 by a pressure fit affixing the fitting 10 to the terminal end of the conduit 12.

While it will be apparent that the preferred embodiment is well calculated to fill the above-stated objects, it will be appreciated that the present invention is susceptible to modification, variation, alteration and change (the expansion means discussed in FIG. 5 for example) without varying from the scope and spirit of the present invention.

What I claim is:

1. A connector assembly adapted to be attached to the terminal end of a flexible conduit, said connector assembly comprising:

a first generally cylindrical member having a forward end and a rearward end positioned about the exterior surface of said terminal end of said conduit, said forward end including an inwardly tapering portion and an inwardly extending flange-like portion dependent therefrom, said flange-like portion adapted to locate said flexible conduit relative to said first cylindrical member, said first cylinder member having a smooth interior surface adjacent said conduit; and a second generally cylindrical member axially disposed to said first member, and positioned about the interior surface of said terminal end of said conduit, said second cylinder member having an outwardly extending flange terminating on one of its ends for orienting the conduit for affixment, said flange positioned inside and abutting said first cylinder member adjacent said inwardly extending flange, said second cylinder member having a smooth exterior surface and a single annular bead forming a discontinuity on said exterior surface, said bead adapted for abutting said conduit against said smooth interior surface of said cylinder member to retain and seal said conduit in said members.

2. The connector assembly according to claim 1, wherein said second cylindrical member further comprises a shoulder-like portion adapted to locate the second member relative to the first member.

3. The connector assembly according to claim 2, wherein said first generally cylindrical member includes a first outwardly extending peripheral bead defining a pocket.

4. The connector assembly according to claim 3, wherein said second generally cylindrical member includes a second outwardly extending peripheral bead adapted to force said conduit into said pocket, thereby retaining said conduit between said first and second members.

5. A method of attaching a connector assembly to the terminal end of a flexible conduit, said method comprising the steps of:

providing a generally cylindrical member having a substantially continuous smooth interior surface on its entire inside;

positioning said cylindrical member about the exterior surface of the terminal end of said flexible conduit;

providing a substantially frustoconical member having a smooth exterior surface;

forming a single annular bend providing a discontinuity on said external surface of said frustoconical member;

positioning said frustoconical member about the interior surface of the terminal end of said flexible conduit; and deforming said frustoconical member to become substantially cylindrical and substantially parallel to said cylindrical member such that said annular bead abuts said conduit against said smooth interior surface of said first cylindrical member thereby retaining and sealing said conduit with said member.

6. The method of claim 5, further comprising the step of:

deforming a first end of said cylindrical member to form an angular end portion.

* * * * *